United States Patent
Clohset et al.

(10) Patent No.: US 6,330,646 B1
(45) Date of Patent: *Dec. 11, 2001

(54) ARBITRATION MECHANISM FOR A COMPUTER SYSTEM HAVING A UNIFIED MEMORY ARCHITECTURE

(75) Inventors: Steve J. Clohset, Sacramento; Trung A. Diep; Wishwesh A. Gandhi, both of Folsom; Thomas A. Piazza, Granite Bay; Aditya Sreenivas, El Dorado Hills; Tuong P. Trieu, Folsom, all of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,965

(22) Filed: Jan. 8, 1999

(51) Int. Cl.[7] .............................. G06F 13/00; G06F 13/18
(52) U.S. Cl. ............................ 711/158; 711/151; 711/154
(58) Field of Search ............................. 711/4, 104, 105, 711/151, 147, 152, 154, 158, 118; 710/129, 28, 113

(56) References Cited

U.S. PATENT DOCUMENTS

| | | | |
|---|---|---|---|
| 4,716,523 | * 12/1987 | Burrus, Jr. et al. | 710/28 |
| 4,901,230 | * 2/1990 | Chen et al. | 711/149 |
| 5,083,260 | * 1/1992 | Tsuchiya | 710/113 |
| 5,247,649 | * 9/1993 | Bandoh | 711/130 |
| 5,611,053 | * 3/1997 | Wu et al. . | |
| 5,629,950 | * 5/1997 | Godiwala et al. | 714/805 |
| 5,659,715 | * 8/1997 | Wu et al. | 711/170 |
| 5,664,152 | * 9/1997 | Ezzet | 711/153 |
| 6,070,215 | * 5/2000 | Deschepper et al. | 710/129 |

* cited by examiner

Primary Examiner—Tuan V. Thai
(74) Attorney, Agent, or Firm—Blakely, Sokoloff, Taylor & Zafman LLP

(57) ABSTRACT

According to one embodiment, a computer system is disclosed that includes a memory and a memory controller coupled to the memory. The memory controller includes an arbitration unit that may be programmed to operate according to a first arbitration mode or a second arbitration mode. The computer system also includes a first device and a second device coupled to the arbitration unit. According to a further embodiment, the first device is assigned a higher priority classification than the second device for accessing the memory while the arbitration unit is operating according to the first arbitration mode. In addition, the first device and the second device are assigned equal priority classifications for accessing the memory while the arbitration unit is operating according to the second arbitration mode.

23 Claims, 9 Drawing Sheets

ARBITRATION MECHANISM FOR A COMPUTER SYSTEM HAVING A UNIFIED MEMORY ARCHITECTURE

FIELD OF THE INVENTION

The present invention relates to memory systems; more particularly, the present invention relates to arbitration policies in a Unified Memory Architecture (UMA).

BACKGROUND OF THE INVENTION

Typical computer systems are implemented using at least two memory subsystems that help to control access to a memory system by requesting agents. The two subsystems are typically a main memory subsystem and a graphics local memory subsystem. The main memory subsystem includes a system memory controller, while the graphics local memory subsystem includes a graphics memory controller. Two memory subsystems are typically necessary for supporting traffic requirements of all requests to access the system memory within an acceptable time latency. Thus, the dual memory architecture provides a performance benefit for typical computer systems. Nevertheless, the additional cost of including a second memory subsystem increases the manufacturing costs of typical computer systems.

Computer systems that include a Unified Memory Architecture combine the functionality of the main memory subsystem and the graphics local memory subsystem. Computer systems with a UMA are obviously less expensive to manufacture due to the absence of a second memory controller (i.e., the graphics memory controller). However, the additional graphics requests to access the system memory typically overload the common system memory controller. Thus, typical UMA computer systems suffer a significant reduction in performance due to the overload of traffic requests at the system memory controller. Consequently, an arbitration policy is needed to balance the demand for system memory and to maximize the available bandwidth in a UMA computer system.

SUMMARY OF THE INVENTION

According to one embodiment, a computer system is disclosed that includes a memory and a memory controller coupled to the memory. The memory controller includes an arbitration unit that may be programmed to operate according to a first arbitration mode or a second arbitration mode.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION OF THE PRESENT INVENTION

Figure 1:
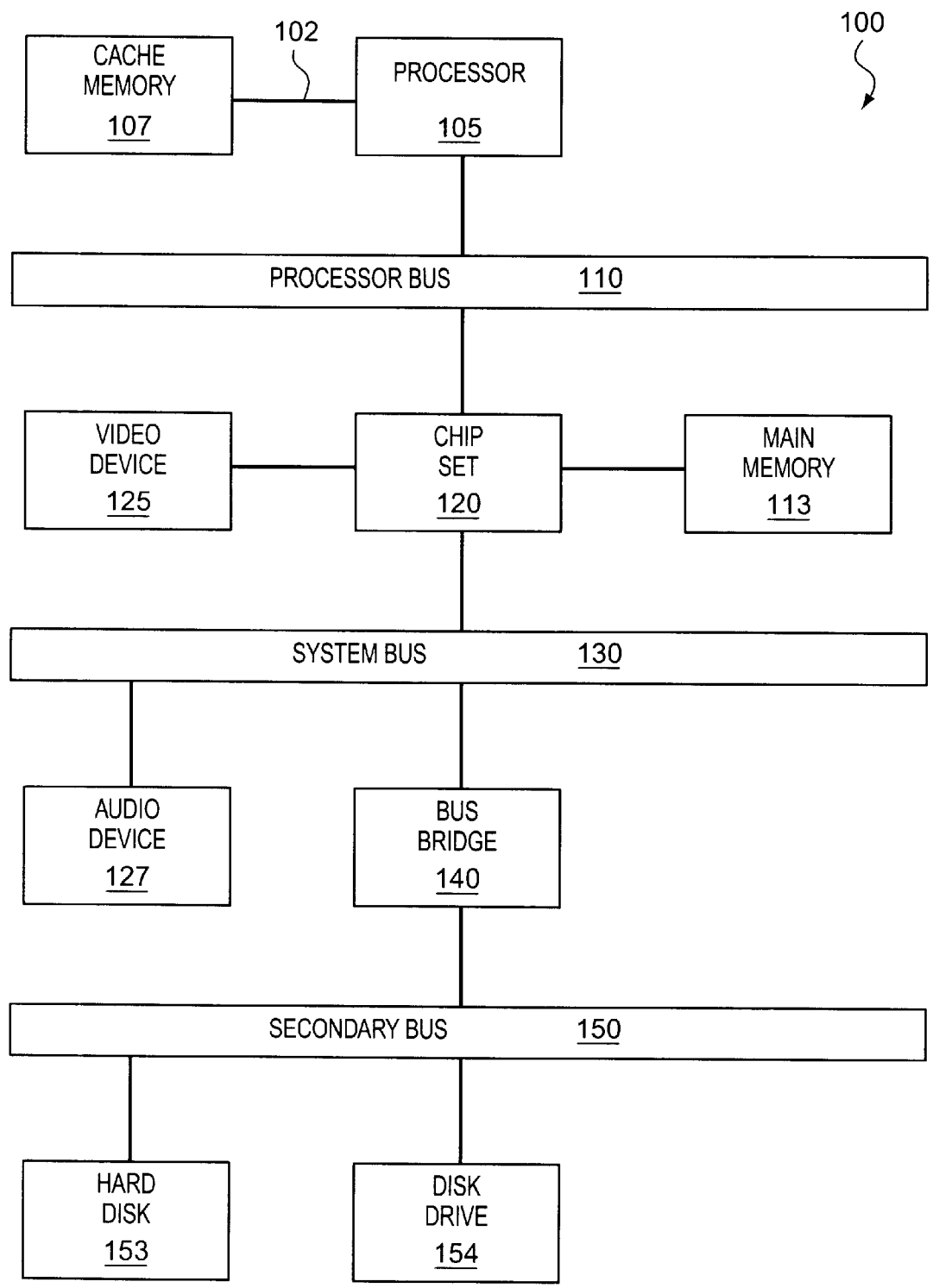
FIG. 1 is a block diagram of one embodiment of a computer system.

FIG. 1 is a block diagram of one embodiment of a computer system 100. Computer system 100 includes a central processing unit (processor) 105 coupled to processor bus 110. In one embodiment, processor 105 is a processor in the Pentium® family of processors including the Pentium® II processor family and mobile Pentium® and Pentium® II processors available from Intel Corporation of Santa Clara, Calif. Alternatively, other processors may be used. Processor 105 may include a first level (L1) cache memory (not shown in FIG. 1).

In one embodiment, processor 105 is also coupled to cache memory 107, which is a second level (L2) cache memory, via dedicated cache bus 102. The L1 and L2 cache memories can also be integrated into a single device. Alternatively, cache memory 107 may be coupled to processor 105 by a shared bus.

Chip set 120 is also coupled to processor bus 110. In one embodiment, chip set 120 operates according to a Unified Memory Architecture (UMA). Main memory 113 is coupled to processor bus 110 through chip set 120. Main memory 113 and cache memory 107 store sequences of instructions that are executed by processor 105. In one embodiment, main memory 113 includes dynamic random access memory (DRAM); however, main memory 113 may be implemented using other memory types. The sequences of instructions executed by processor 105 may be retrieved from main memory 113, cache memory 107, or any other storage device. Additional devices may also be coupled to processor bus 110, such as multiple processors and/or multiple main memory devices. Computer system 100 is described in terms of a single processor; however, multiple processors can be coupled to processor bus 110.

Video device 125 is also coupled to chip set 120. In one embodiment, video device includes a video monitor such as a cathode ray tube (CRT) or liquid crystal display (LCD) and necessary support circuitry.

Processor bus 110 is coupled to system bus 130 by chip set 120. In one embodiment, system bus 130 is a Peripheral Component Interconnect (PCI) standard bus developed by Intel Corporation of Santa Clara, Calif.; however, other bus standards may also be used. Multiple devices, such as audio device 127, may be coupled to system bus 130.

Bus bridge 140 couples system bus 130 to secondary bus 150. In one embodiment, secondary bus 150 is an Industry Standard Architecture (ISA) bus developed by International Business Machines of Armonk, N.Y.; however, other bus standards may also be used, for example Extended Industry Standard Architecture (EISA) developed by Compaq Computer, et al. Multiple devices, such as hard disk 153 and disk drive 154 may be coupled to secondary bus 150. Other devices, such as cursor control devices (not shown in FIG. 1), may be coupled to secondary bus 150.

Figure 2:
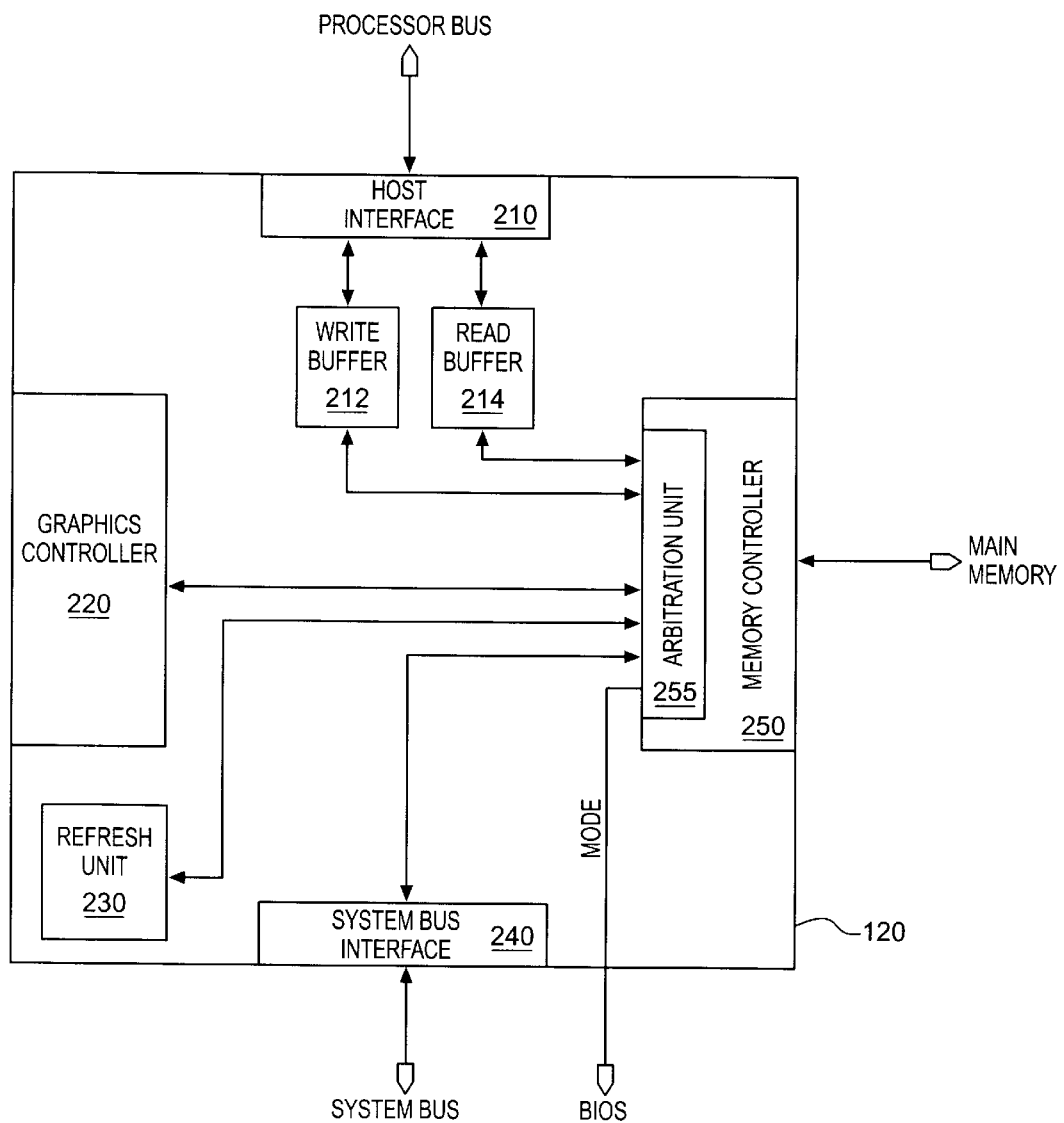
FIG. 2 is a block diagram of one embodiment of a chipset.

FIG. 2 is a block diagram of one embodiment of chipset 120. Chipset 120 includes a host interface 210 coupled to processor bus 110 and receives requests from processor 105 to access main memory 113. Write buffer 212 is coupled to host interface 210 and buffers requests received from host interface 210 to conduct write transactions with main memory 113. Read buffer 214 is also coupled to host interface 210 and is used to buffer requests received from host interface 210 to conduct read transactions with main memory 113.

Chipset 120 also includes a graphics controller 220. Graphics controller 220 handles video data requests to access main memory 113. Refresh Unit 230 is also included within chipset 120. Refresh unit 230 triggers memory refreshes that recharge electrical cells within main memory 113 in order to maintain data integrity. In addition, chipset 120 includes a system bus interface 240 coupled to system bus 130. System bus interface 240 receives requests from input/output (I/O) devices located on system bus 130 (e.g., audio device 127) to access main memory 113.

Further, chipset 120 includes a memory controller 250. Memory controller 250 is coupled to write buffer 212, read buffer 214, graphics controller 220, refresh unit 230 and system bus interface 240. Memory controller 250 accesses main memory 113 for memory transactions based upon commands received from processor 105 and one or more peripheral devices coupled to chip set 120, such as video device 125. Memory controller 250 may read data from, and write data to, main memory 113.

Figure 3:
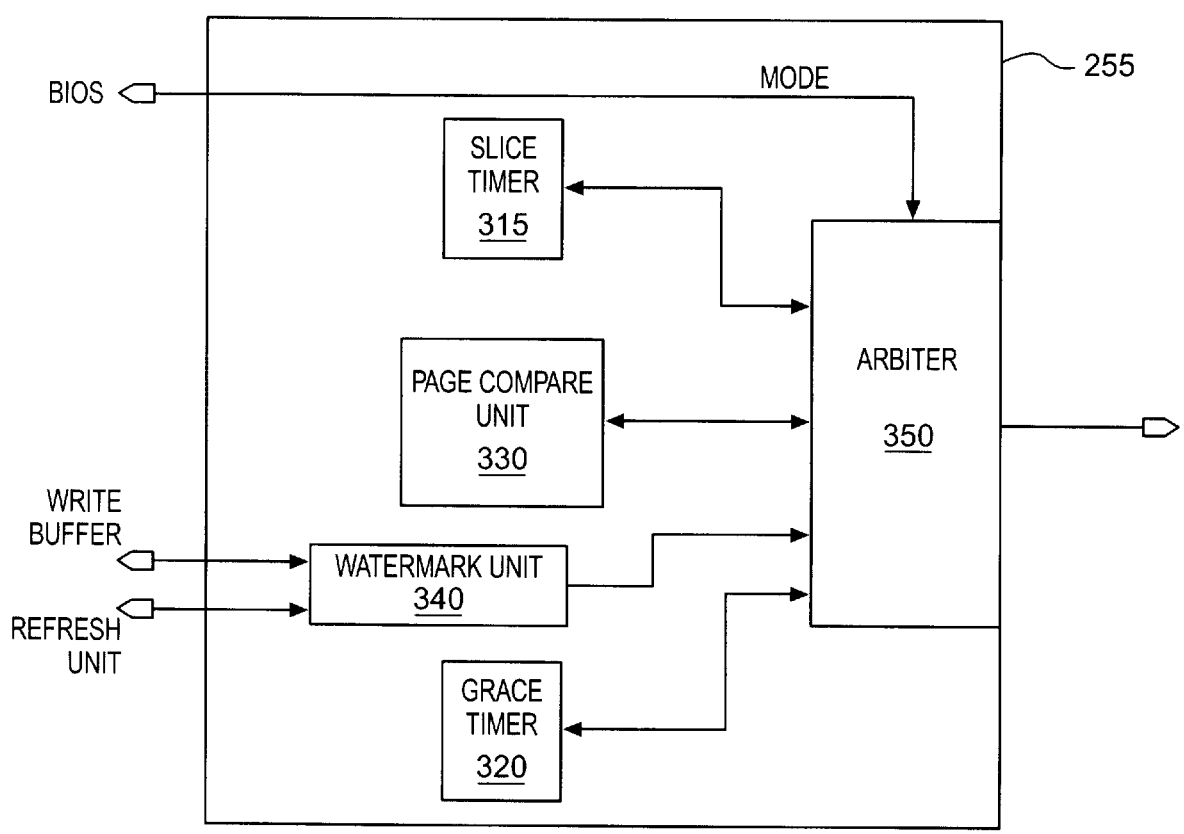
FIG. 3 is a block diagram of one embodiment of an arbitration unit.

Memory controller 200 includes arbitration unit 255. Arbitration unit 255 coordinates access to main memory 113 by various agents, such as write buffer 212, read buffer 214, refresh unit 230, etc. FIG. 3 is a block diagram of one embodiment of arbitration unit 255. Arbitration unit 255 includes a slice timer for operation in a time slice mode, a grace timer 320 and a page compare unit 330 for operation in a conditional grace grant mode, a watermark unit 340 for operation in a watermark mode and an arbiter 350. Arbiter 350 receives access requests from agents, determines the relative priority of the access requests, and then grants access to one of the agents at a time depending upon the relative priorities.

As implied above, arbitration unit 255 and arbiter 350 may perform according to various modes of operation. According to one embodiment, arbiter 350 may coordinate access to main memory 113 based upon:

1. A Priority Designation Mode; or
2. A Time Slice Mode.

In addition, while operating in either the priority designation mode or the time slice mode, arbiter 350 may also operate according to:

3. A Conditional Grace Grant Mode; and
4. A Watermark Mode.

Further, the above arbitration modes of operation are programmable such that a system 100 user may select a mode depending on the desired performance. Arbitration unit 255 receives a MODE signal that indicates the mode in which it is to operate. The mode configuration may be stored in a basic input output system (BIOS) memory (not shown) coupled to secondary bus 150 and transmitted to chipset 120 upon system 100 startup or reset via a configuration mechanism, such as a PCI configuration write.

I. Arbitration Modes

A. Priority Designation Mode

While operating in the priority designation mode, requests to access main memory 113 are categorized as follows, with the number one (1) having the highest priority:

1. High Priority;
2. Host and System I/O;
3. Normal priority graphics; and
4. Opportunistics.

The high priority category includes requests that must be serviced by main memory 113 within a predetermined latency in order to satisfy a real time demand. For example, video device 125 coupled to graphics controller 220 may flicker if service by main memory 113 is substantially displayed. The high priority category also includes requests that must be serviced in order to prevent a system failure. For example, data corruption will occur at main memory 113 if memory refresh cycles received from refresh unit 230 are excessively delayed without being executed.

The host and system I/O category includes requests received from processor 110 (e.g., read transactions from read buffer 214) and requests from system I/O devices on system bus 130 received via system bus interface 240. Requests from devices on system bus 130 are classified as isochronous and asynchronous. Isochronous requests (e.g., requests from a video camera, network traffic, etc.) are latency sensitive and must be serviced by main memory 113 within an acceptable time period. Asynchronous requests (e.g., requests from hard disk 153, disk drive 154, etc.) have no such time restrictions.

Figure 8:
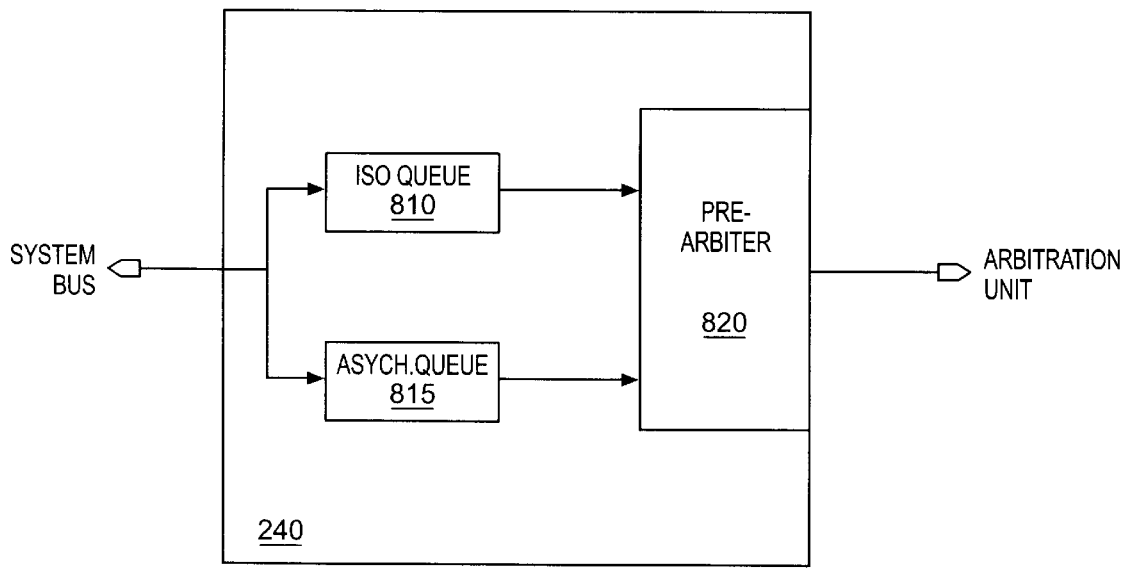
FIG. 8 illustrates a block diagram one embodiment of a system bus interface.

FIG. 8 is a block diagram of one embodiment of bus interface 240. System bus interface includes an isochronous queue 810 and an asynchronous queue 815 coupled to system bus 130. Isochronous queue 810 stores isochronous requests to gain access of main memory 113, while asynchronous queue 815 stores asynchronous requests. System bus interface 240 also includes a pre-arbiter 820 coupled to isochronous queue 810 and asynchronous queue 815. Pre-arbiter 820 selects the system I/O requests (isochronous or asynchronous) that are permitted to arbitrate for access to main memory 113. Isochronous requests are given higher priority due to the critical time latencies The normal priority graphics category includes non-real time graphics requests from graphics controller 220 to access main memory 113. The opportunistics category includes requests that have relaxed latency requirements that may be postponed for a substantial amount of time without causing degradation in system 100 performance. For example, posted write transactions from write buffer 212 and main memory refreshes are queued in their respective buffers and postponed for execution at a later time.

Figure 4A:
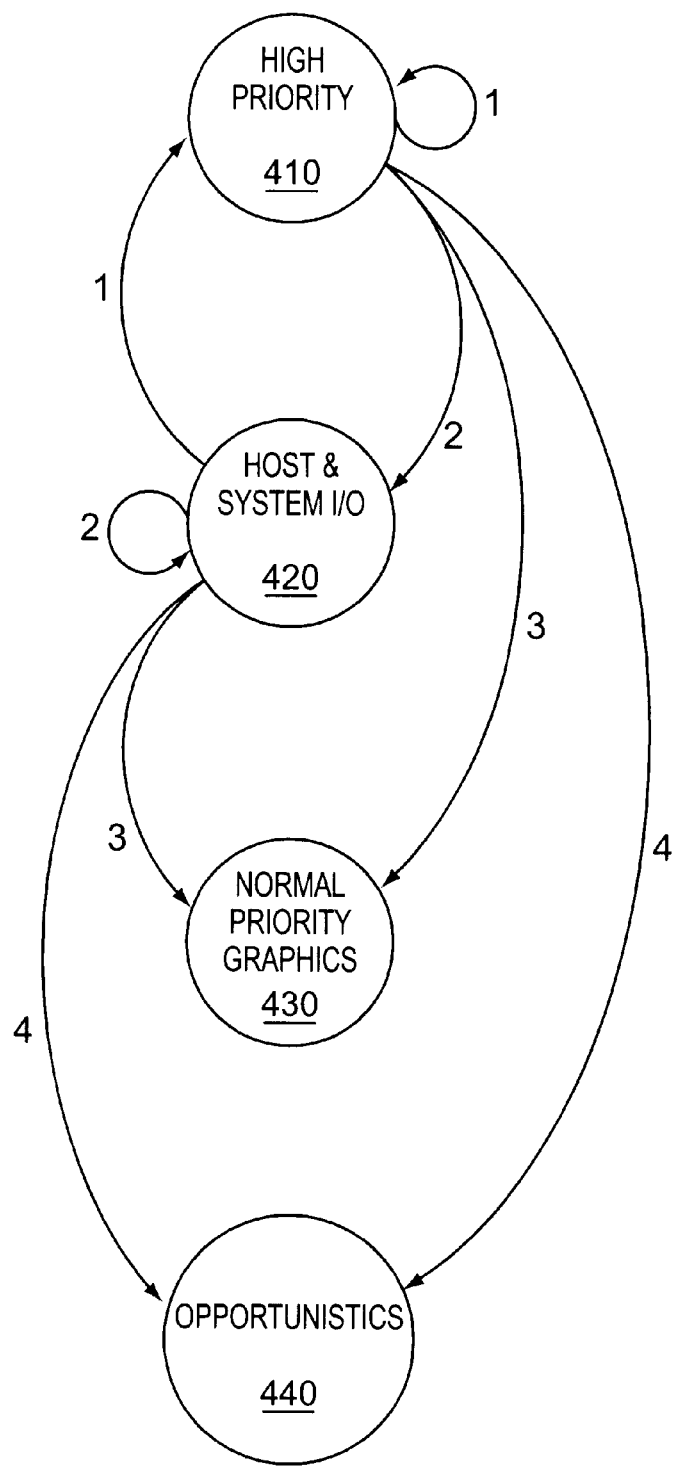
FIG. 4a is a state diagram of one embodiment of an arbiter.

FIG. 4a is a state diagram of arbiter 350 while operating in the priority designation mode. Note that many transitional arcs of the state diagram have been purposefully omitted to avoid confusion. Arbiter 350 includes the following states: high priority (HP) 410; host and system I/O (HIO) 420; normal priority graphics (NPG) 430; and opportunistics (OPP) 440. If arbiter 350 is in a state and receives one or more requests to access main memory 113, a determination is made as to the priority between the request(s) and current state. For example, if arbiter 350 is operating in HIO 420 and receives a normal priority graphics request from graphics controller 220 to gain normal access of main memory 113, arbiter 350 remains in HIO 420. Arbiter 350 transitions to NPG 430 after main memory 113 has completed servicing HIO 420, assuming a higher priority agent does not subsequently request access. However, if a high priority request is received, arbiter 350 immediately transitions from HIO 420 to HP 410.

As described above, high priority requests are highest due to its real time requirements, and opportunistic requests are lowest because it can be delayed with little visible performance impact. Host and system I/O requests are designated a higher priority than normal priority graphics requests since processor 105 is data latency sensitive. For example, delays in servicing processor 105 may cause dramatic performance degradation.

Moreover, processor 105 typically accesses main memory 113 in a well-behaved manner. For instance, processor 105 typically cycles between a burst of data requests and a period of inactivity. Most of the processor requests (i.e., ninety-five percent (95%) or higher) are serviced at cache memory 107. Therefore, it is infrequently necessary for processor 105 to access main memory 113 in order to fetch data. The period of inactivity between processor data requests at main memory 113 allows for a sufficient bandwidth for normal priority graphics requests.

However, in some instances, such as the use of heavy graphic applications or small cache memory 107 size, host and system I/O requests may lead to the starvation of normal priority graphics requests. In such cases it may be necessary to provide equal priority ranking between host and system I/O requests, and normal priority graphics requests. Further, continuous interruption of normal priority graphics requests by host and system I/O requests results in reduced efficiency of main memory 113 operation. For example, each time normal priority requests are interrupted, the accessed page of main memory 113 must be closed since host and system I/O requests are not likely to access the same page. Subsequently, a new page of memory must be opened in order to service the host and system I/O requests. After the host and system I/O requests have completed accessing main memory 113 and the normal priority graphics request is again granted access, the page accessed by the host and system I/O requests must be closed and the normal graphics request page must be re-opened. The timeslice mode assists in mitigating these concerns by providing equal priority ranking between host and system I/O requests and normal priority graphics requests.

B. Timeslice Mode

Upon receiving configured information via the MODE signal indicating the timeslice mode of operation, arbiter 350 operates according to a timeslice arbitration technique. Using the timeslice technique, requests to access main memory 113 are categorized as follows, with the number one (1) having the highest priority:

1. High Priority;
2. Host and System I/O and Normal priority graphics; and
3. Opportunistics.

The timeslice technique ensures that normal priority graphics request starvation will not occur as in the priority designation scheme. Host and system I/O accesses of main memory 113 are regulated by slice timer 315, shown in FIG. 3. Slice timer 315 limits the duration in which host and system I/O requests may be serviced by main memory 113. After expiration of slice timer 315, normal priority graphics requests are granted access to main memory 113, assuming there are no high priority requests. Once normal priority requests are granted access, host and system I/O requests are not granted access to main memory 113 until the expiration of slice timer 315. According to one embodiment, the duration of slice timer 315 may be programmed by a system 100 user.

Figure 4B:
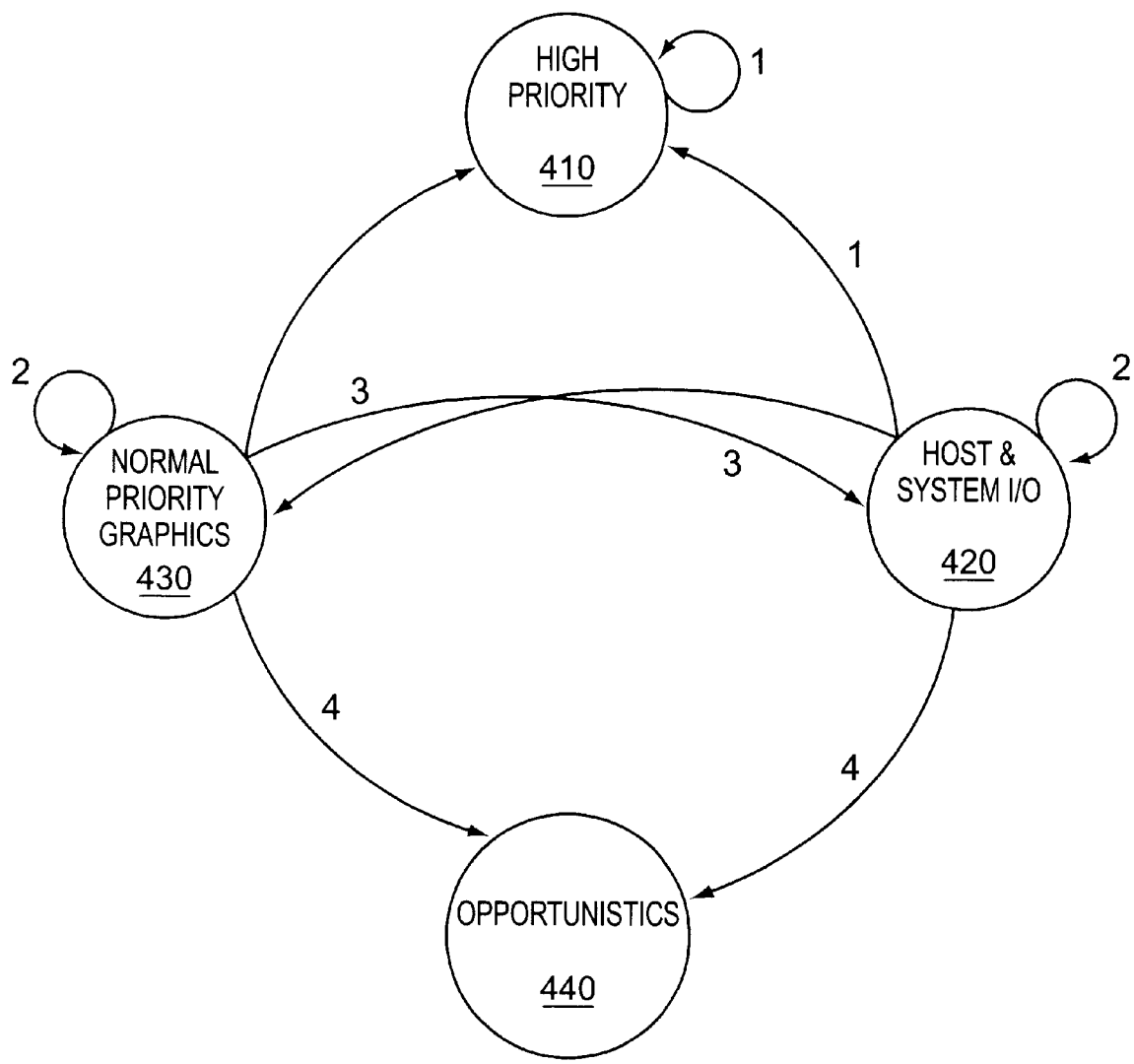
FIG. 4b is a state diagram of one embodiment of an arbiter.

FIG. 4b is a state diagram of arbiter 350 while operating in the timeslice mode. Arbiter 350 operates the same as in the priority mode under most conditions. For example, if arbiter 350 is in a state (e.g., OPP 440) and receives a request from a higher priority agent to access main memory 113, arbiter 350 shifts from the lower to the higher priority state (e.g., HP 410) and grants control of main memory 113 to the higher priority request. However, if arbiter 350 is in a state (e.g., NPG 430) and receives a request from an agent with an equivalent priority (e.g., Host and System I/O group), arbiter 350 remains in its current state servicing the NPG request until the expiration of slice timer 315. After the expiration of slice timer 315, arbiter 350 shifts to the state with the equivalent priority, assuming there has been no request from a higher priority agent.

Figure 5:
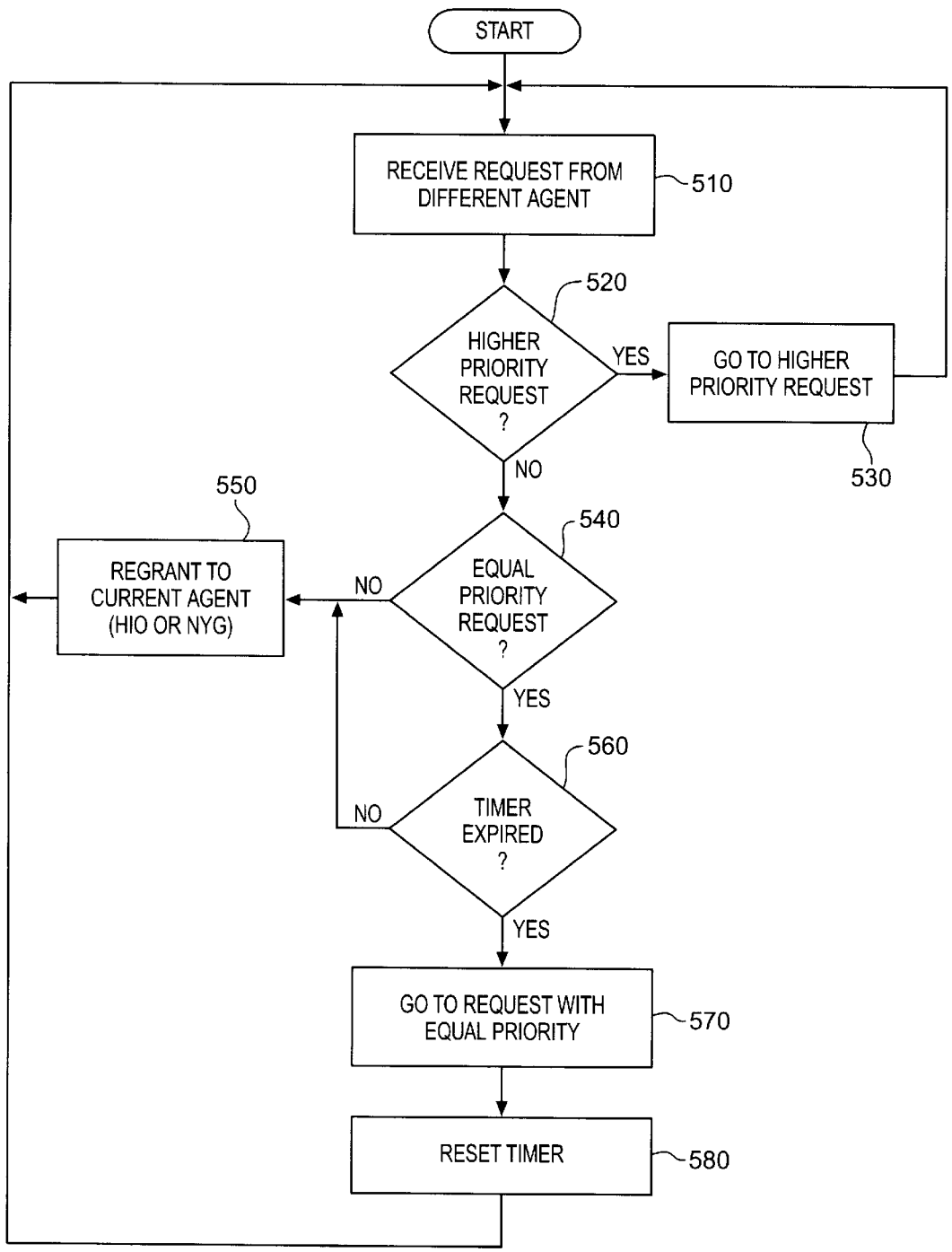
FIG. 5 is a flow diagram of one embodiment of the operation of an arbiter.

FIG. 5 is a flow diagram of the operation of arbiter 350 while arbiter 350 is operating in the time slice mode. While arbiter 350 is in either the NPG or HIO state, a request from a different agent to access main memory 113 is received, process block 510. At process block 520, it is determined whether the request is from an agent with a higher priority than the state arbiter 350 is currently in. If the request is from a higher priority agent, arbiter 350 transitions from its current state to the higher priority state, process block 530. Accordingly, the higher priority state is granted access of main memory 113. Subsequently, control is returned to process block 510 wherein another request is received.

If it is determined that the request is not from a higher priority agent, it is determined whether the received request is from an agent with an equivalent priority ranking, process block 540. If the request is not from an agent with an equal priority, the request was from a lower priority agent and arbiter 350 remains in its current state to continue servicing the current agent at least until a higher priority request is received, process block 550. If the received request is from an agent with equal priority, it is determined whether slice timer 315 has expired, process block 560.

If it is determined that slice timer 315 has not expired, arbiter 350 remains in its current state servicing the current controlling agent. However, if slice timer 315 has expired, arbiter 350 shifts to the state with equivalent priority, process block 570. At process block 580, slice timer 315 is reset to provide the newly granted agent a new count. Subsequently, control is returned to process block 510 wherein a different agent's request is received. One of ordinary skill in the art will recognize that process blocks 520–560 may be processed in a variety of different sequences. For example, the process disclosed in process block 540 may be executed before the process in process block 520. Alternatively, process blocks 520–560 may be executed in parallel.

According to one embodiment, if arbiter 350 shifts from either HIO 420 or NPG 430 to a higher priority agent before completion of service, arbiter 350 returns to its previous state after servicing the higher priority agent if slice timer 315 had not expired. In such a case slice timer is reset upon re-entering the state. However, in another embodiment, upon re-entry into one of the equivalent states, slice timer 315 continues to count from the time it had accrued upon shifting to the higher priority agent.

An additional advantage of the time slice technique is that by not interrupting normal priority graphics requests to service host and system I/O requests, the grouping of transactions that are naturally localized in a certain range of memory address space is permitted. For instance, whenever back to back transactions access the same page of main memory 113 (i.e., page hit), the access time is reduced, and may be minimized. On the other hand, whenever back to back transactions access different page of main memory 113 (i.e., a page miss), the access time is maximized since each transaction requires additional time to precharge a different page before the data access is made. Consequently, the timeslice technique increases the likelihood of a page hit because requests from the host and system I/O group, as well as those from the normal priority graphics group, tend to be localized in the same pages of main memory 113.

C. Conditional Grace Grant

The conditional grace grant technique expands on the concept of maximizing the likelihood of a main memory 113 page hit. In this arbitration scheme, arbiter 350 remains in its current state upon receiving both a request by the agent currently in control of main memory 113 and a request from a higher priority agent. Nevertheless, the grant of access of main memory 113 back to the controlling agent is contingent on the following request being a page hit. Page compare unit 330, shown in FIG. 3, makes the determination of whether a subsequent request will be a page hit. As long as subsequent requests by the controlling agent are page hits, the agent retains control of main memory 113. However, once page compare unit 330 determines that a subsequent request by a controlling agent would result in a page miss, arbiter 350 shifts to the higher priority state.

Additionally, the time an agent may retain control of main memory 113 is limited by grace timer 320. Grace timer 320 is activated upon an agent first regaining control of main memory 113 under a grace condition. However, upon the expiration of grace timer 320, the agent must relinquish control of main memory 113, regardless of whether page compare unit 330 determines that a subsequent request will be a page hit. Grace timer 320 prevents the imposition of an excessive wait time for other agents requesting access to main memory 113. Grace timer 320 may be programmable in order for a user to select an optimal value. An optimal value is a time limit that imposes no serious latencies to other requesting agents. Additionally, the conditional grant technique may operate in either the time slice mode or the priority designation mode.

Figure 6:
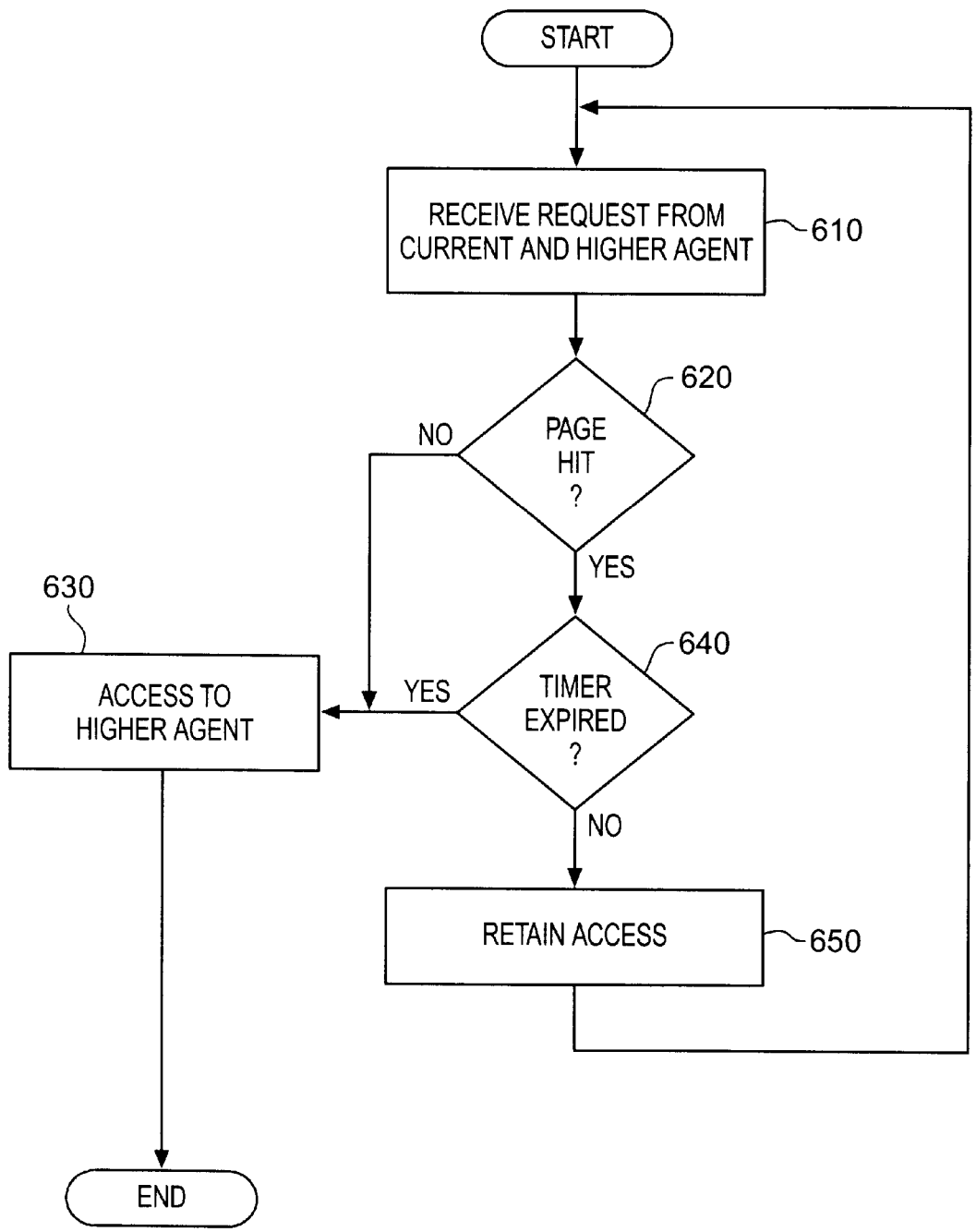
FIG. 6 is a flow diagram of one embodiment of the operation of an arbiter.

FIG. 6 is a flow diagram of the operation of arbiter 350 in accordance with one embodiment of the present invention. At process block 610, a high priority request is received, as well as a request from the agent that is currently in control of main memory 113. At process block 620, page compare unit 330 determines whether the following request from the controlling agent will be a page hit. If page compare unit 330 determines that the subsequent request is a page miss, the higher priority request is granted access to main memory 113. However, if page compare unit 330 determines that the subsequent request is a page hit, it is determined whether grace timer 320 has expired, process block 640.

If grace timer 320 has expired, control is returned to process block 630 wherein access of main memory 113 is granted to the higher priority state. If grace timer 320 has not expired, the controlling agent retains control of main memory 113, process block 650. Subsequently, control is returned to process block 610 wherein another request is received. By grouping many page hits accesses together, unnecessary main memory 113 precharge time is eliminated. Consequently, the available main memory 113 bandwidth is maximized.

D. Watermark Levels

The watermark technique takes advantage of loose latency requirements for opportunistic requests. For example, posted write requests from write buffer 212 and main memory 113 refresh requests from refresh unit 230 are queued in holding buffers, and execution is postponed until arbiter 350 is idle. However, during times of heavy workload at main memory 113, the opportunity for opportunistic agents to gain access of main memory 113 is reduced. If there is little service from main memory 113, the holding queues within each respective agent may reach maximum capacity and cause detrimental performance impact.

The watermark technique operates in either the time slice mode or the priority designation mode and requires arbiter 350 to be sensitive to the levels (or watermarks) of holding queues of opportunistic agents. If a holding queue is near empty, the watermark level is low and the opportunistic group receives a low priority as discussed above. However, if a holding queue is near full, the watermark level is high and the opportunistic group receives a high priority. For example, using the priority rankings discussed above, if write buffer 212 or the holding queue within refresh unit 230 is near full, the ranking of the opportunistic group is raised to the highest priority. Additionally, the priority of the opportunistics group may be gradually increased as the holding queues fill up. For instance, if the queues are half full the priority may be increased to a second or third ranking.

Figure 7:
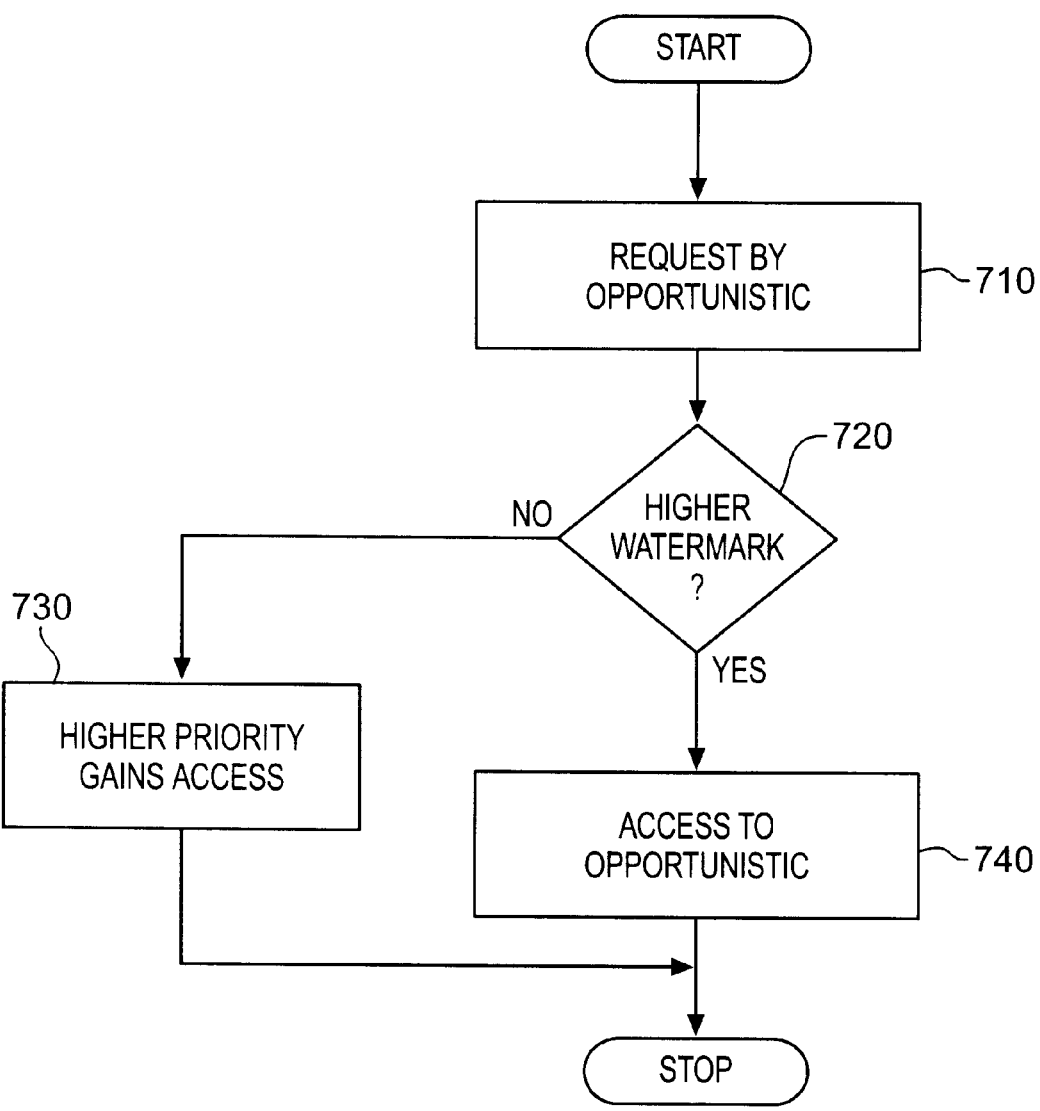
FIG. 7 is a flow diagram of one embodiment of the operation of an arbiter.

FIG. 7 is a flow diagram of the operation of arbiter 350 in accordance with one embodiment of the present invention. At process block 710, a request is made by an opportunistic agent to access main memory 113. At process block 720, arbiter 350 checks the watermark levels and determines whether the opportunistic group has a higher priority than its current state or other received requests. If it is determined that the watermark levels are relatively low, arbiter 350 remains in its current state or shifts to another requesting agent with higher priority, process block 730. If it is determined that the watermark levels are relatively high, arbiter 350 shifts to the opportunistics state and access to main memory 113 is granted to the requesting opportunistic agent, process block 740.

Although the present invention has been described with respect to a Unified Memory Architecture, one of ordinary skill in the art will appreciate that the present invention may be implemented using other memory system configurations. Further, the arbitration techniques described in the present invention may be implemented in other electronic systems, such as networks, printers, etc.

Thus, an arbitration policy to increase the available bandwidth in a UMA computer system has been described.

What is claimed is:

1. A computer system comprising:
    a memory;
    a memory controller coupled to the memory, wherein the memory controller includes an arbitration unit that receives a mode select signal, wherein the arbitration unit operates according to a first arbitration mode whenever the mode select signal is in a first state and operates according to a second arbitration mode whenever the mode select signal is in a second state;
    a first device coupled to the arbitration unit; and
    a second device coupled to the arbitration unit, wherein the first device is assigned a higher priority classification than the second device for accessing the memory while the arbitration unit is operating according to the first arbitration mode, wherein the first device and the second device are assigned an equal priority classification for accessing the memory while the arbitration unit is operating according to the second arbitration mode, and wherein the arbitration unit withholds access of the memory from the second device for a predetermined time interval while the first device has control of the memory whenever operating according to the second arbitration mode.

2. The computer system of claim 1, wherein the arbitration unit withholds access of the memory from the first device for a predetermined time interval while the second device has control of the memory whenever operating according to the second arbitration mode.

3. The computer system of claim 1, further comprising a third device, wherein the third device is assigned a lower priority classification than the first and second devices whenever the arbitration unit is operating according to the first or second arbitration modes.

4. The computer system of claim 3, wherein the arbitration unit operates according to a third mode wherein in the third mode the arbitration unit withholds access of the memory from the first and second devices for a predetermined time interval if a subsequent request by the third device to access the memory results in a page hit.

5. The computer system of claim 4, wherein the arbitration unit grants access to the first or second device if the subsequent request by the third device to access the memory results in a page miss.

6. The computer system of claim 3, wherein the third device includes a request buffer for storing requests to access the memory.

7. The computer system of claim 6, wherein the arbitration unit operates according to a third mode wherein in the third mode the arbiter assigns the third device a higher priority classification than the first and second devices if the request buffer is full and assigns the third device a lower priority classification than the first and second devices if the request buffer is empty.

8. The computer system of claim 3 further comprising:
   a host interface coupled to the arbitration unit;
   a system bus interface coupled to the arbitration unit;
   a graphics controller coupled to the arbitration unit; and
   a refresh unit coupled to the arbitration unit.

9. The computer system of claim 8, wherein the first device is a processor coupled to the arbitration unit via host interface, the second device is a graphics device coupled to the arbitration unit via graphics controller and the third device is the refresh unit.

10. The computer system of claim 9, wherein the first device is coupled to the arbitration unit via the system bus interface.

11. The computer system of claim 10, wherein the system bus interface further includes:
    a pre-arbiter;
    an isochronous buffer coupled to the pre-arbiter; and
    an asynchronous buffer coupled to the pre-arbiter;
    wherein the pre-arbiter assigns a higher priority classification to requests stored in the isochronous buffer than requests stored in the asynchronous buffer.

12. The computer system of claim 3, further comprising a time sensitive device, wherein the third device is assigned a higher priority classification than the first, second and third devices whenever the arbitration unit is operating according to the first or second arbitration modes.

13. The computer system of claim 1, wherein the arbitration unit receives a signal indicating whether the arbitration unit is to operate according to the first mode or the second mode.

14. The computer system of claim 1, wherein the memory controller operates according to a unified memory architecture.

15. A method of accessing a memory in a unified memory architecture (UMA) computer system; comprising:
    granting access of the memory to a first agent after arbitration;
    receiving a request from a second agent to access the memory;
    receiving a request from a third agent to access the memory, wherein the third agent has a lower request classification than the first agent;
    determining whether the second agent has a priority request classification equivalent to the first agent;
    if so, determining whether a predetermined time interval has elapsed since the first agent was granted access to the memory;
    if not, withholding access of the memory from the second agent;
    determining whether a buffer within the third agent is relatively full; and
    if so, granting access of the memory to the third agent.

16. The method of 15, further comprising granting access of the memory to the second agent if it is determined that the second agent has a higher priority request classification than the first agent.

17. The method of claim 15, further comprising granting access of the memory to the second agent if it is determined that the predetermined time interval has elapsed.

18. The method of claim 17, wherein the first agent is a central processing unit (CPU) and the second agent is a graphics device.

19. The method of claim 17, wherein the first agent is a graphics device and the second agent is a system input/output device.

20. The method of claim 15, further comprising withholding access of the memory from the third device if the buffer is not relatively full.

21. A method of reducing access time experienced by a first agent contending for access to a resource with a plurality of additional agents, the method comprising:
    granting access of the resource to the first agent;
    receiving a request from a second of the plurality of additional agents to access the resource;
    receiving a request from the first agent to retain control of the resource;
    determining whether the request by the first agent will result in accessing the same page of the resource;
    if not, granting access of the resource to the second agent;
    determining whether a predetermined time interval has expired since the first agent was granted access to the resource; and
    if so, withholding access of the resource from the second agent;
    otherwise, granting access of the resource to the second agent.

22. A method of accessing a memory in a unified memory architecture (UMA) computer system, comprising:
    granting access of the memory to a first agent after arbitration;
    receiving a request from a second agent having a request buffer to access the memory;
    determining whether the second agent has a higher priority request classification than the first agent;
    if not, determining whether the request buffer is relatively full;
    if so, granting access of the memory to the second agent; and
    otherwise, withholding access of the memory from the second agent if the buffer is not relatively full.

23. The method of claim 22, further comprising granting access of the memory to the second agent if the second agent has a higher priority request classification than the first agent.

* * * * *